(12) United States Patent
Diemer et al.

(10) Patent No.: US 8,464,877 B2
(45) Date of Patent: Jun. 18, 2013

(54) FILTER MODULE AND METHOD FOR ITS MANUFACTURE

(75) Inventors: Wolfgang Diemer, Waldstetten (DE); Martin Zeiler, Schwäbisch Gmünd (DE)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 13/487,893

(22) Filed: Jun. 4, 2012

(65) Prior Publication Data

US 2012/0241372 A1      Sep. 27, 2012

Related U.S. Application Data

(63) Continuation of application No. 10/844,585, filed on May 13, 2004, now Pat. No. 8,215,494, which is a continuation of application No. PCT/EP02/12544, filed on Nov. 9, 2002.

(30) Foreign Application Priority Data

Nov. 13, 2001   (DE) .................................. 101 55 591

(51) Int. Cl.
| | |
|---|---|
| *B01D 35/00* | (2006.01) |
| *B01D 27/00* | (2006.01) |
| *B01D 35/28* | (2006.01) |
| *B01D 29/00* | (2006.01) |
| *B01D 39/31* | (2006.01) |
| *B01D 29/07* | (2006.01) |

(52) U.S. Cl.
USPC ........ 210/497.1; 210/435; 210/437; 210/457; 210/483; 210/494.1; 210/497.01; 210/417

(58) Field of Classification Search
None
See application file for complete search history.

(56) References Cited

U.S. PATENT DOCUMENTS

| | | |
|---|---|---|
| 2,339,703 A | 1/1944 | Kamrath |
| 2,537,897 A | 1/1951 | Hunter |
| 2,561,685 A | 7/1951 | Boggs |
| 2,631,732 A | 3/1953 | Vocelka |
| 2,646,887 A | 7/1953 | Robinson et al. |
| 3,061,107 A | 10/1962 | Taylor |
| 3,347,391 A | 10/1967 | Steensen |
| 3,592,769 A | 7/1971 | Decker |
| 3,971,373 A | 7/1976 | Braun |

(Continued)

FOREIGN PATENT DOCUMENTS

| | | |
|---|---|---|
| DE | 144 207 | 10/1980 |
| EP | 0 291 883 | 11/1988 |

(Continued)

*Primary Examiner* — Benjamin Kurtz
(74) *Attorney, Agent, or Firm* — Leydig, Voit & Mayer, Ltd.

(57) ABSTRACT

A filter module is formed of wound filter material having openings wherein the boundary surfaces of the openings constitute flow-through surfaces. The openings of the wound layers of the filter material form channels angled relative to the winding axis, wherein one group thereof opens at the outer peripheral surface of the roll and the other group opens at the inner peripheral surface of the roll and wherein the channels on the other end, respectively, are closed and wherein the channels, angled relative to the winding axis, are separated from one another by filter material, and wherein the inner area of the roll has a central channel arranged around a winding axis.

20 Claims, 5 Drawing Sheets

U.S. PATENT DOCUMENTS

| | | |
|---|---|---|
| 4,695,300 A | 9/1987 | Takagi |
| 4,792,397 A | 12/1988 | Rasmussen |
| 4,863,602 A | 9/1989 | Johnson |
| 6,113,784 A | 9/2000 | Stoyell et al. |
| 7,934,605 B2 | 5/2011 | Diemer et al. |
| 7,938,275 B2 | 5/2011 | Diemer et al. |
| 8,127,935 B2 | 3/2012 | Diemer et al. |
| 8,215,494 B2 * | 7/2012 | Diemer et al. ............. 210/497.1 |
| 2002/0046971 A1 | 4/2002 | Strohm et al. |
| 2010/0059422 A1 | 3/2010 | Hahn et al. |
| 2010/0089814 A1 | 4/2010 | Diemer et al. |

FOREIGN PATENT DOCUMENTS

| | | |
|---|---|---|
| FR | 873 926 | 7/1942 |
| JP | 60-238112 | 11/1985 |
| JP | 62-123215 | 8/1987 |
| JP | 10-263343 | 10/1998 |
| WO | WO 98/35740 A1 | 8/1998 |

* cited by examiner

FILTER MODULE AND METHOD FOR ITS MANUFACTURE

The present disclosure relates to the subject matter disclosed in international application No. PCT/EP02/12544 of Nov. 9, 2002, which is incorporated herein by reference in its entirety and for all purposes.

BACKGROUND OF THE INVENTION

The invention relates to a filter module of the kind defined in the preamble of claim 1 and a method for manufacturing a filter module of the kind defined in the preamble of claim 19.

WO 98/35740 discloses a filter module in which openings are formed in the filter material whose boundary surfaces constitute the filter surface. The filter module is produced by stacking a plurality of identical disc-shaped filter elements whose openings are substantially arranged atop one another so that channels are formed in the longitudinal direction of the filter module through which the unfiltered material flows into the filter module and from which filtrate flows out of the filter module. The filter elements are arranged in a frame which compresses the discs. For exchanging the filter material, the individual filter discs must be removed and new individual filter discs must be inserted into the frame. The expenditure for exchanging the individual filter discs is very great. When producing the circular discs from sheet-like filter material, a lot of waste is produced.

The object of the invention is to provide a filter module of the aforementioned kind which can be easily exchanged.

Moreover, the object resides in that a method for a simple manufacture of the filter module is to be provided.

SUMMARY OF THE INVENTION

This object is solved by a filter module with the features of claim 1 and, with respect to the method, by a method having the features of claim 19.

By winding the filter material to a roll, a compact filter results which, in its entirety, can be inserted with minimal expenditure into a filter housing and can be removed therefrom. The effective filter thickness is independent of the thicknesses of the filter material because flow through the filter material is parallel to its surface. Flow through the filter material takes place from one channel that opens at an outer peripheral surface to a channel that opens at an inner peripheral surface. The opposite flow direction is also possible. By means of the arrangement of the openings, which form the channels, the effective filter thickness can be varied within a broad range without this requiring filter materials with different thicknesses. The diameter of the roll and thus the size of the effective filter surface is determined by the length of the wound web and can thus be varied within a broad range. The axial length of the roll is determined by means of the width of the wound material, wherein, by varying it, the filter surface can be varied also. The filter module can be adjusted in this way with minimal expenditure to very different filtration requirements. The filter material can be, for example, metal, plastic material, or cellulose. Mixtures of these materials can also be advantageous.

As a result of the winding step, the filter material is shape-stable so that in the most favorable case no foreign materials are required; disposal is simplified in this way. The filter module comprises a large integrated filter surface because the filter size in the direction of the longitudinal axis is determined only by the required filter surface and filter thickness and not by additional holding elements. It is possible to produce filter modules having a very large filter surface and requiring only a small space. The filter module can be inserted into inexpensive compression-proof filter housings so that no complex frame constructions are required. The compact, robust configuration reduces the required expenditure for packaging a filter module and thus lowers the logistic expenses.

Expediently, the filter material is a depth filter material. In particular, the central channel and the outer peripheral surface are cylindrical. In this way, the filter module can be advantageously employed in a cylindrical housing. However, it can also be advantageous when the central channel and the outer peripheral surface have an elliptical cross-section.

It is provided that the openings are formed as slots. For increasing the stability, it is expedient that the slots are interrupted in the peripheral direction by stays. The flow-through surfaces are arranged, in particular, perpendicularly to the winding axis in a disc shape about the winding axis. However, it may be advantageous to arrange the channels slantedly relative to the winding axis at an angle that is smaller than 90°. In this way, advantages are achieved, in particular, during backwashing. The angle between the winding axis and the channels is advantageously from 30° to 90°. It is provided that in the direction of the winding axis channels are arranged that open alternatingly at the inner peripheral surface and at the outer peripheral surface. In particular, in the radial direction of the filter module a border layer adjoins the openings and separates inner and outer area from one another. Expediently, the border layer is comprised of filter material and has a thickness in the radial direction which matches at least the effective filter thickness of a filter layer in the axial direction. No additional materials are required as a result of the embodiment of the border layer made from filter material. By means of a corresponding thickness of the border layer it is ensured that it does not constitute a bypass.

For the fixation of the material wound to a filter module, the inner and/or outer layers of the roll are expediently glued and/or welded. It can also be advantageous to press the filter module. Alternatively, or in addition thereto, the filter module can be held together by clamping or supporting means. As a further embodiment it is provided that the filter module for increasing the stability is wound onto a support pipe. For increasing the stability it is advantageous to wind a support material into the filter module wherein, in particular, for depth filter materials, it is expedient, for the purpose of compressing the filter material in the direction of the filtrate side and for increasing the filtration resolution, to wind into the filter module straps with at least partially wedge-shaped cross-section which are arranged alongside the slots and which compress the filter material in a direction toward the slots. Preferably, the wedge-shaped straps are arranged along the slots open toward the inner area.

The filter material can be a nonwoven, woven, screen, expanded metal, or mesh. Advantageously, sintered woven, sintered powder, foamed materials, filter layers, or depth filter layers can be employed.

The method for manufacturing a filter module of filter material provides that openings, in particular, slots, are produced in the filter material in the longitudinal direction of the filter material and that the filter material is wound about a winding axis. In this way, the filter module can be produced simply and in an automated fashion. Winding of the filter material, in comparison to stacking individual filter material layers, constitutes a substantially faster process. The openings of wound layers positioned atop one another form channels which are sealed radially toward the inner area or outer area of the roll. It is provided that the filter material is in the form of a web and the slots are introduced by means of wedge-shaped knives which widen the slots and compress the adjacent filter material. Because of the widening of the slots, no waste is produced in the manufacture of the filter material. By means of the slot width the degree of compression and thus the filtration resolution can be adjusted in the case of depth filter material.

Expediently, the knives are arranged on a roller. The filter module can be produced continuously when a station in which the slots are produced is arranged upstream of a winding station. In particular, the openings, particularly the slots, are realized by jet cutting. Expediently, the openings, particularly, slots, are cut out. When cutting out the openings, no compressed areas are produced in the border zones of the openings. This can be advantageous when a homogenous filter material is desired across the filter material thickness.

Expediently, the filter module is glued together wherein the adhesive is, in particular, a resin which is also contained in the filter material. In this way, the introduction of an additional material is avoided so that the filter module is comprised exclusively of substances which are already contained in the filter material. As an alternative measure, the filter module can also be welded. However, it can also be taken into consideration to employ, instead of gluing or welding or in addition thereto, clamping means are arranged around the filter module. Also, winding of the filter module with compression may be advantageous. For increasing the stability, it can be provided that the filter module is wound onto a support pipe. For stabilization purposes, it is particularly provided that support material is wound into the filter module. By winding additional support material into the filter module, the stability of the filter module can be adjusted according to the requirements. Expediently, straps with at least partially wedge-shaped cross section are wound into the filter module and positioned alongside the slots, and thus compress the filter material in the direction toward to the slots. In particular, the wedge-shaped straps are arranged along slots open toward the inner area.

Examples of the invention will be explained in the following by means of the drawing.

DETAILED DESCRIPTION OF THE INVENTION

Figure 1:
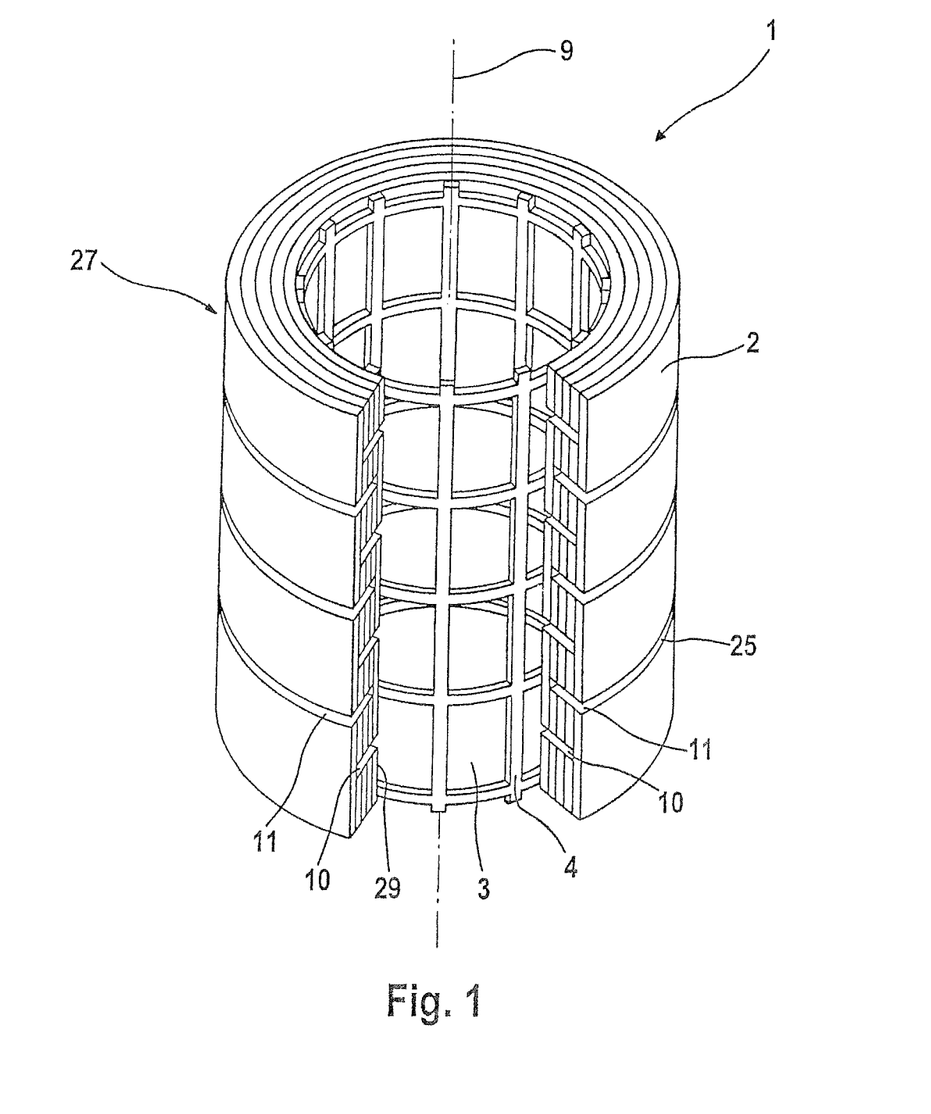
FIG. 1 a perspective view onto a depth filter module with depth filter material shown in section.

FIG. 1 shows an axially symmetrical depth filter module 1 which is comprised of depth filter material 2 wound about a winding axis 9. The wound depth filter material 2 forms a roll 27. In place of the depth filter material, other filter materials can be employed. The depth filter material 2 is wound about a support pipe 4 which is preferably made of a metal screen or plastic screen and serves for stabilizing the depth filter module 1 and which can assist in the winding step. The filter material 2 can be, for example, nonwoven, woven, screen, expanded metal, or mesh. It is also possible to employ sintered woven, sintered powder, foamed material, filter layers or depth filter layers. Within the support screen 4 a central channel 3 is formed. At the inner peripheral surface 29, the depth filter material 2 rests against the support screen 4. The depth filter material 2 has openings 25 which are embodied as slots 10, 11. Other shapes of the openings 25 can be advantageous.

Figure 2:
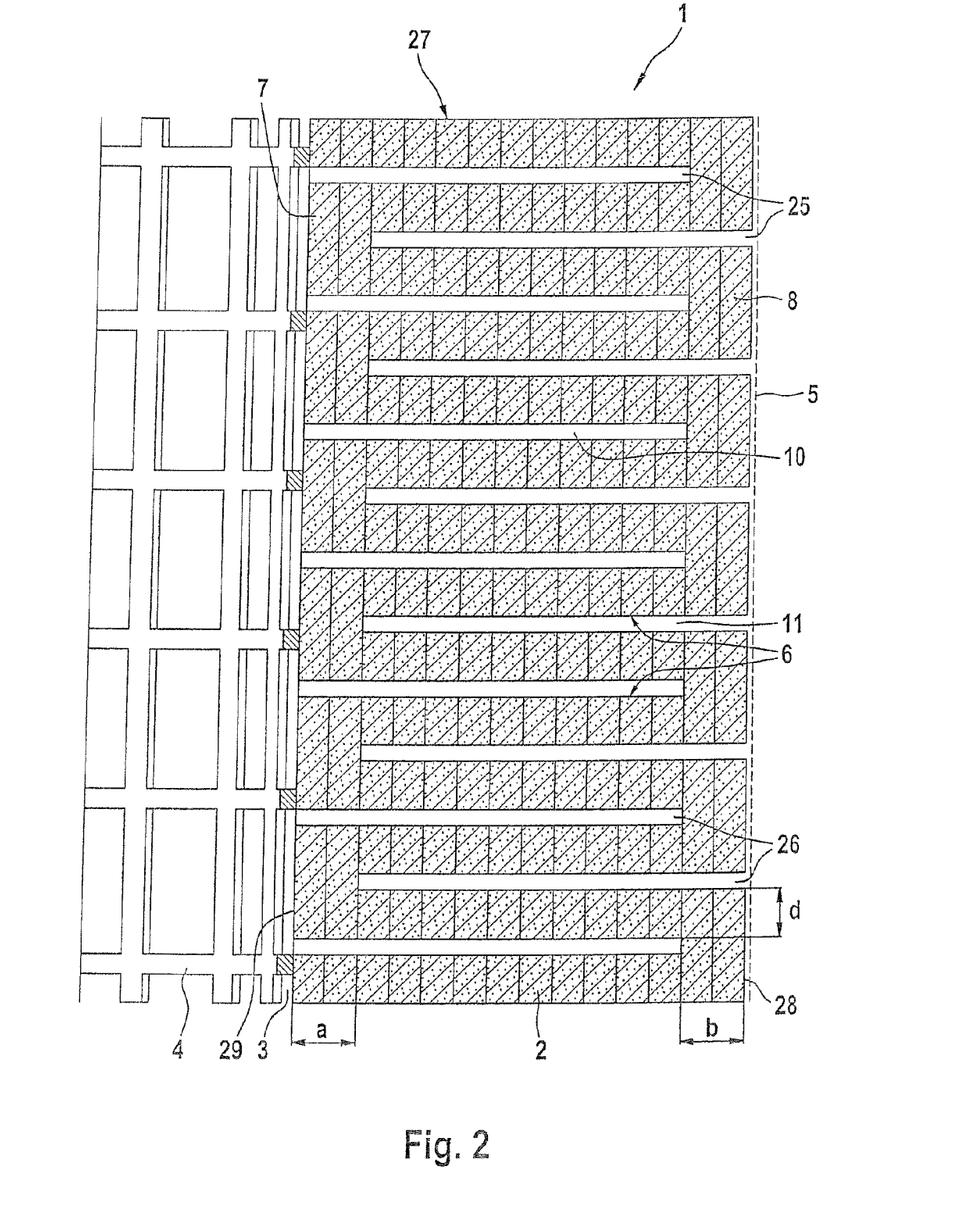
FIG. 2 half a section of a depth filter module.

In FIG. 2, half of a section view of the depth filter module 1 with the support pipe 4 and the depth filter material 2 wound about the support pipe 4 forming the roll 27 is illustrated. The central channel 3 arranged within the support pipe 4 forms together with the slots 10, which form channels 26 opening at the inner peripheral surface 29, the inner area of the depth filter module 1. The outer area is separated from the inner area by depth filter material 2 and comprises the channels 26 opening at the outer peripheral surface 28 and formed by the slots 11. A support screen 5 can be arranged on the outer peripheral surface 28 of the roll 27 which provides a clamping means that holds the roll 27 of depth filter material 2 together without closing off flow though the channels 26 opening at the outer peripheral surface 28. The boundary surfaces of the slots 10 and 11 form the flow-through surfaces 6 which are arranged perpendicularly to the surface of the depth filter material 2 delimiting the channels 26. The flow-through surfaces 6 extend disc-shaped about the central channel 3. The channels 26 however can be slanted relative to the winding axis 9 at angles smaller than 90°. In particular, angles between the winding axis and the channels of 30° to 90° are advantageous.

The thickness d of the depth filter material 2, through which the fluid to be filtered flows, corresponds to the spacing between the two slots 10 and 11 in the axial direction. For separating the slots 11 from the inner area and the slots 10 from the outer area, the border layer 7 at the inner peripheral surface 29 and the border layer 8 at the outer peripheral surface 28 of the depth filter module 1 are arranged. The border layers 7, 8 are comprised of depth filter material 2. The thickness a of the border layer 7 and the thickness b of the border layer 8 are at least as large as the thickness d of the depth material 2 through which flow is to be realized. It may be advantageous not to form the border layers 7, 8 of the depth filter material 2, but of a material impermeable to fluid which then seals the slots 10 outwardly and the slots 11 inwardly.

Figure 3:
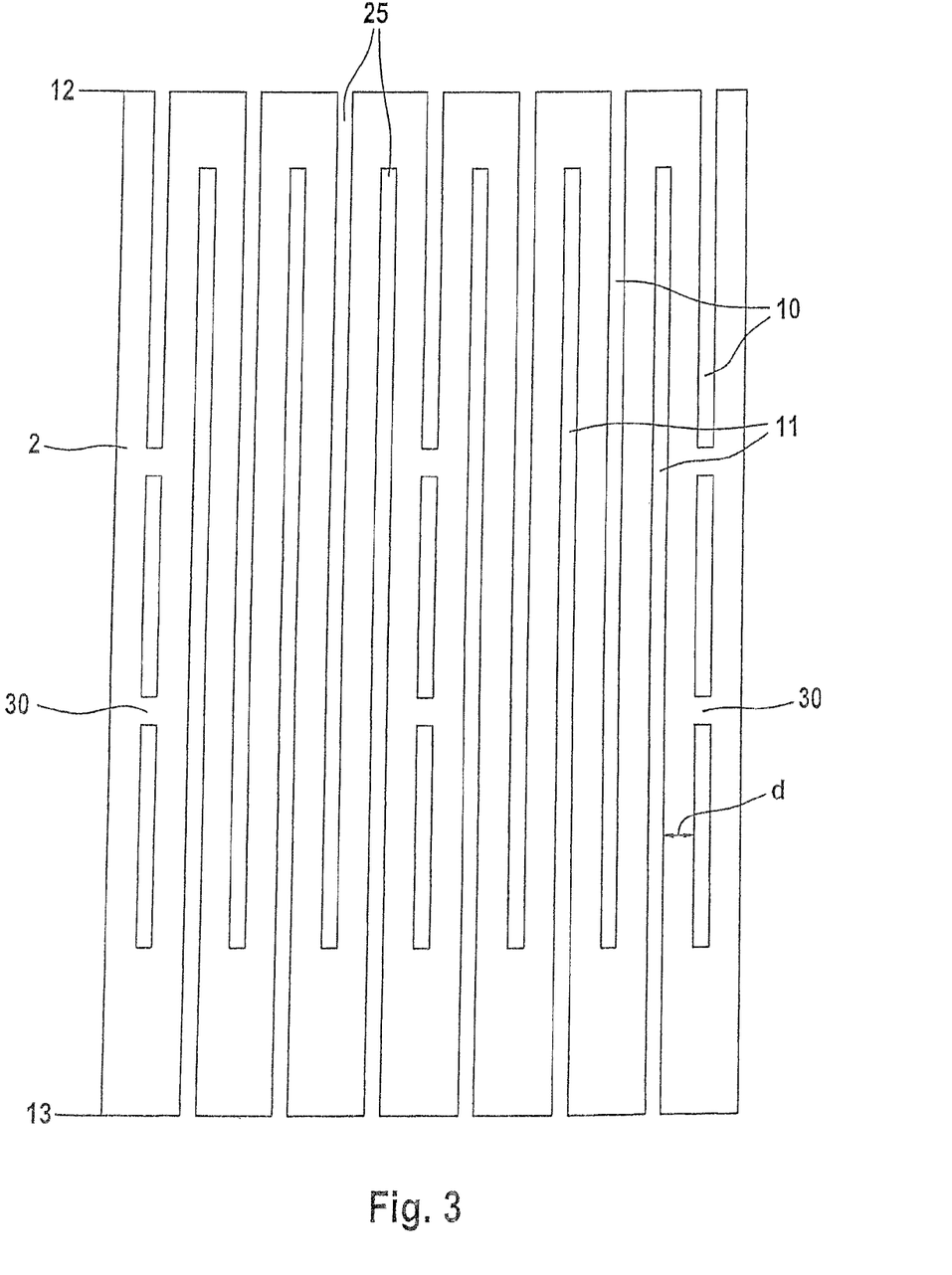
FIG. 3 a plan view onto web-shaped depth filter material with slots arranged therein.

In FIG. 3, the depth filter material 2, with openings 25 arranged therein that are embodied as slots 10 and 11, is illustrated before winding the roll 27. The depth filter material 2 has a rectangular shape and the slots 10 and 11 extend in the longitudinal direction of the depth filter material 2. At the winding start 12, which is positioned on the central channel 3 for the winding step, the slots 10 that are oriented toward the inner area are open. The area between the winding start 12 and the beginning of the slots 11 forms the border area 7 of the depth filter material 2 after completion of winding. The slots 10 end before the winding end 13 wherein the area between the end of the slots 10 and the winding end 13 forms the border area 8. Three of the slots 10 are interrupted in the longitudinal direction by stays 30. It may be advantageous that a preponderant number or all slots 10, 11 are interrupted by stays 30. The transverse stays 30, which are comprised of filter material, serve for increasing the stability of the wound depth filter module 1 and function as a winding aid.

The slots 10, 11 can be produced by a wedge-shaped knives which are arranged on a drum which extends in the transverse direction of the depth filter material 2. The slots 10, 11 are cut by the knives and, because of the wedge shape, are widened to the required slot width without this producing waste. Advantageously, the knives for the slots 10 and for the slots 11 are arranged on separate rollers so that the slot length can be adjusted independently from one another. The slots 10, 11 can also be cut out or produced by means of a jet cutting.

For producing a depth filter module 1, the slotted depth filter material 2 is wound beginning at the winding start 12. For increasing the stability, the depth filter material 2 can be wound onto a support pipe 4. Winding with pressing of the filter material may be advantageous. However, for a satisfactory stability of the depth filter material 2 it is expedient to wind the depth filter material 2 onto an auxiliary mandrel which is removed after the winding process is complete. For fixation of the roll 27 of the depth filter module 1, the depth filter material 2 can be glued together or welded. The fixation of the finish-wound depth filter material 2 by means of clamping means such a support screen 5 or clamping straps as well as a combination of these fixation possibilities can be advantageous.

Figure 4:
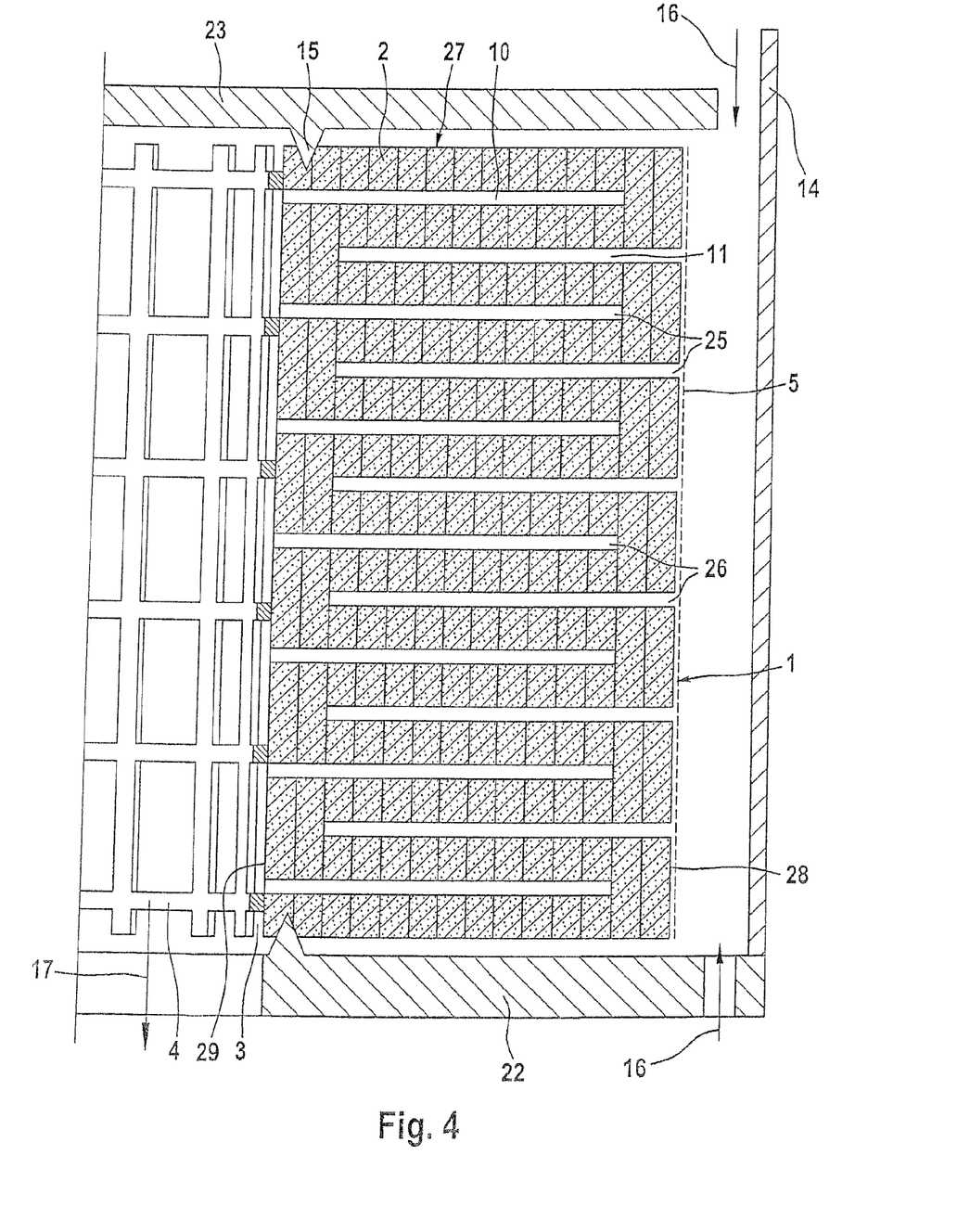
FIG. 4 a sectional illustration of the depth filter module of FIG. 1 in a filter housing.

The depth filter module 1, as illustrated in FIG. 4, can be arranged in a cylindrical filter housing 14. Sealing between the inner area and outer area at the filter housing 14 is realized by means of a circular sealing ring 15 formed on the bottom 22 and the lid 23 of the filter housing 14. The sealing ring 15 engages the depth filter material 2 and is pressed fixedly into it when the lid 23 is secured on the housing 14. This configuration does not require separate seals.

The unfiltered material flows in the direction of the arrows 16 into the filter housing 14 against the outer side of the depth filter module 1. From the channels 26, which open at the outer peripheral surface 28 and are formed by the slots 11, the unfiltered material flows via the depth filter material 2 of the thickness d into the channels 26 opening at the inner peripheral surface 29 and formed by the slots 10; flow takes place parallel to the surface of the depth material 2. The filtrate flows through the channels 26 formed by the slots 10 into the central channel 3 from where it exits the filter housing 14 in the direction indicated by arrow 17. The filter, however, can also be used in the inverse direction, i.e., counter to the direction of the arrows 16 and 17. A backwashing possibility is thus provided in principle.

For improving the filtration results, filtering aids can be added to the unfiltered material, such as diatomaceous earth. For increasing the filtration surface, several filter modules can be inserted into a filter housing 14, in particular, depth filter modules 1 which are stacked on top of one another and separated from another by plates; the plates are provided for sealing the filter modules relative to one another and for stabilization purposes.

Figure 5:
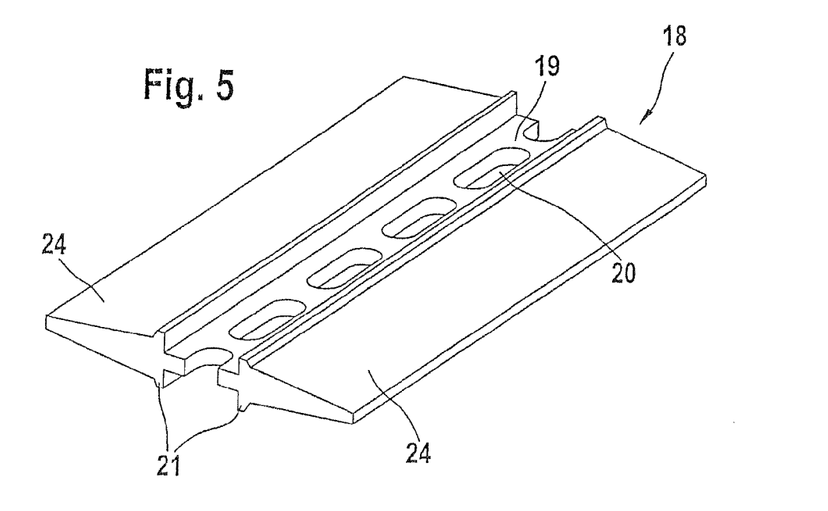
FIG. 5 a perspective view of a wedge-shaped strap material.

In FIG. 5, a wedge-shaped strap 18 is illustrated which serves for compressing the depth filter material 2 on the side of the filtrate. In this way, the filtration resolution is increased in the direction of filtration. The wedge-shaped strap 18 has two lateral wedges 24 which will come to rest between the wound layers of the depth filter material 2. In this way, the edges 21 form together with the slots 10 the channels 26 opening at the inner peripheral surface 29. The slot width corresponds to the width of a stay 19 which is arranged between the wedges 24 and the adjoining edges 21. The openings 20 in the stay 19 serve as passages for the filtrate.

Figure 6:
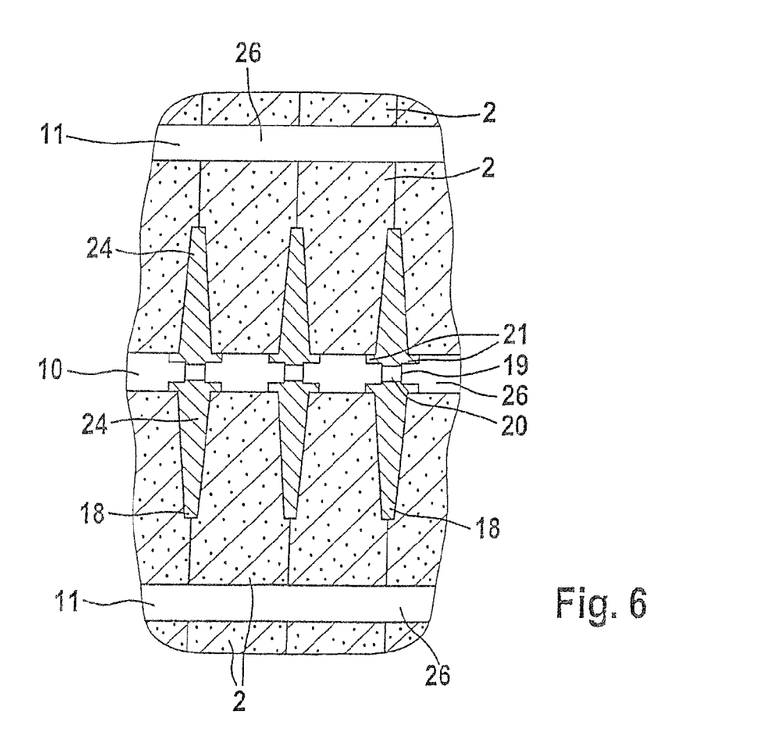
FIG. 6 a sectional illustration of a portion of a depth filter module into which wedge-shaped strap material has been wound.

In FIG. 6, a section of a depth filter module 1 is illustrated into which a wedge-shaped strap 18 has been wound. The edges 21 of the wedge-shaped strap 18 delimit a channel 26 formed by the slots 10 which in this case is arranged on the filtrate side. The wedge-shaped strap 18 has a stay 19 which is arranged perpendicularly to the flow direction in the slots 10. The wedges 24 compress the depth filter material 2 in the direction toward the channel 26. Because of the slant angle of the wedges 24, the increase of filtration resolution can be adjusted in the direction of the channel 26.

For increasing the stability of the depth filter module, instead of the wedge-shaped strap 18, or in addition thereto, straps of different materials can be wound into the roll which are positioned parallel to the flow direction between the individual layers of the depth filter material 2. Instead of the wedge-shaped strap 18 with the stay 19 it is also possible to be employ a wedge-shaped strap which has two or several stays between the wedges 24.

What is claimed is:

1. A filter module, comprising a depth filter material with introduced arranged openings having boundary surfaces constituting flow-through surfaces,
   the depth filter material being wound about a winding axis and forming a spiral roll,
   wherein the introduced openings, positioned atop one another, of wound layers of the depth filter material form groups of channels angled relative to the winding axis, one group of channels opening at an outer peripheral surface of the spiral roll and the other group of channels opening at an inner peripheral surface of the spiral roll and wherein the channels are closed at their other end, respectively, and
   the channels, angled relative to the winding axis, are separated from one another by the depth filter material, and
   wherein the spiral roll has an inner area comprising a central channel arranged around the winding axis;
   the module having a radial direction wherein, in the radial direction of the filter module, a border layer adjoins the openings and separates the inner area and the outer area from one another, and wherein the border layer comprises depth filter material and has a thickness (a, b) in the radial direction which matches at least the effective filter thickness (d) of a depth filter layer in the axial direction.

2. The filter module according to claim 1 wherein the central channel is cylindrical.

3. The filter module according to claim 1, wherein the openings are formed as slots.

4. The filter module according to claim 3, wherein the filter module has a peripheral direction, and the slots in the peripheral direction of the filter module are interrupted by stays.

5. The filter module according to claim 3, including straps having an at least partially wedge-shaped cross-section, wherein the straps are wound into the filter module and are arranged alongside the slots and compress the filter material in a direction toward the slots.

6. The filter module according to claim 5, wherein the wedge-shaped straps are arranged along the slots opening toward the inner area.

7. The filter module according to claim 1, wherein the flow-through surfaces are arranged perpendicularly to the winding axis in a disc shape around the winding axis.

8. The filter module according to claim 1, wherein the channels are slanted relative to the winding axis at an angle smaller than 90°.

9. The filter module according to claim 1, wherein in the direction of the winding axis, channels opening at the inner peripheral surface and channels opening at the outer peripheral surface are arranged alternatingly.

10. The filter module according to claim 1, wherein the filter module is glued together.

11. The filter module according to claim 1, wherein the filter module is welded together.

12. The filter module according to claim 1, wherein the filter module is held together by clamping and supporting means.

13. The filter module according to claim 1, wherein the filter module is wound onto a support pipe.

14. The filter module according to claim 1, wherein a support material is wound into the filter module.

15. The filter module of claim 1, wherein the depth filter material is glued together.

16. The filter module of claim 1, wherein inner layers of the spiral roll are glued.

17. The filter module of claim 1, wherein outer layers of the spiral roll are glued.

18. The filter module of claim 1, wherein inner layers of the spiral roll are welded.

19. The filter module of claim 1, wherein outer layers of the spiral roll are welded.

20. The filter module of claim 1, wherein the depth filter material is welded together.

* * * * *